F. L. MARCILLE.
EGG SEPARATOR.
APPLICATION FILED APR. 12, 1915.
1,213,120.
Patented Jan. 16, 1917.
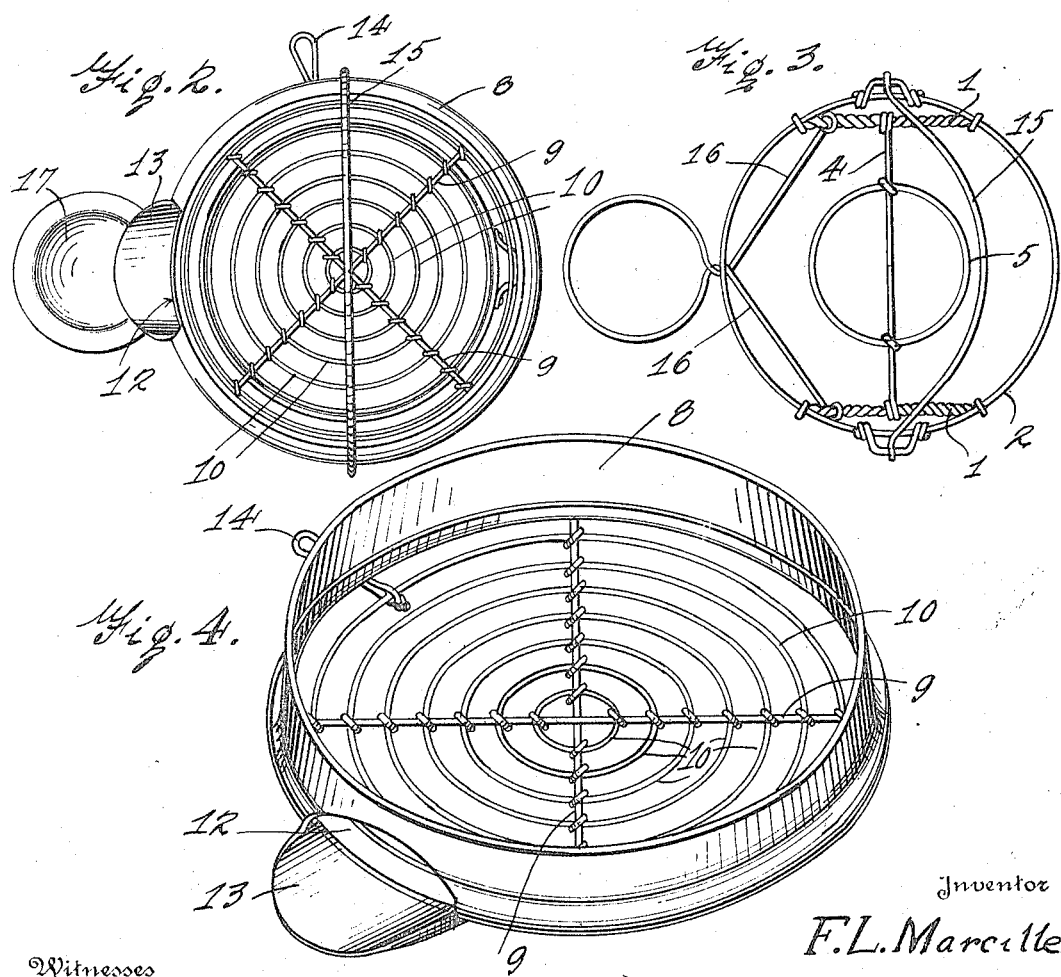

UNITED STATES PATENT OFFICE.

FLORA L. MARCILLE, OF THOROLD, ONTARIO, CANADA.

EGG-SEPARATOR.

1,213,120.　　　　　Specification of Letters Patent.　　Patented Jan. 16, 1917.

Application filed April 12, 1915. Serial No. 20,831.

*To all whom it may concern:*

Be it known that I, FLORA L. MARCILLE, a subject of the King of England, residing at Thorold, in the Province of Ontario, Dominion of Canada, have invented certain new and useful Improvements in Egg-Separators; and I do hereby declare the following to be a full, clear, and exact description of the invention, such as will enable others skilled in the art to which it appertains to make and use the same.

This invention relates to an egg separator.

An object of the invention resides in the provision of a device by means of which the yolks may be separated from the whites of eggs.

A further object of the invention resides in so constructing the device that after the parts of the eggs have been thus separated the yolks may be readily dropped into a container.

A further object of the invention resides in so constructing the device that it will be exceedingly simple and easy to manufacture.

With these and other objects in view, such as will appear as the description progresses, my invention comprises the combination and arrangement of parts as set forth in and falling within the scope of the appended claims.

Referring to the drawing: Figure 1 is a side elevation of a device constructed in accordance with my invention. Fig. 2 is a plan view thereof. Fig. 3 is a plan view of the frame with the strainer and containers removed. Fig. 4 is a detail of the strainer.

Referring to the drawing wherein like parts are indicated by like characters throughout the several views:—In the embodiment of my invention shown in the drawings, I have provided a frame which consists of a pair of legs 1 to the upper ends of which a horizontally disposed ring 2 is secured. Extending between the lower ends of the legs is a cross bar 4 on which a skeleton platform 5 is secured. Removably mounted on this platform is a container 6 having a handle 7 thereon by means of which it may be removed from the frame.

Removably mounted on the ring 2 is a strainer 8 which consists of a bottom formed of cross wires 9 and circular wires 10. This strainer further includes a side wall which inclines upwardly and is provided at one side with an opening 12. Extending outwardly from this strainer beneath the opening 12 is a spout 13 and extending at right angles to the spout 13 is a handle 14 by means of which the strainer may be tipped.

The frame is provided with a pivoted handle 15. When it is desired to separate the white from the yolk of an egg it is only necessary to break the egg and drop it into the strainer 8. The white of the egg will flow through the wire bottom of the strainer and the yolk will remain within the strainer.

In order that the yolk may be dropped from the strainer into a suitable container, I have secured a bracket 16 to the legs 1 in which a container 17 is removably mounted. This container 17 is located directly beneath the spout 13 of the strainer 8 so that when the strainer is tipped by means of the handle thereon the yolk of the egg will move through the hole in the wall of the strainer and drop from the spout 13 into the container 17. The containers 6 and 17 may then be removed from the frame and the whites and yolks of the eggs used separately.

From the foregoing description it will be seen that I have provided a very simple and efficient egg separator.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In an egg separator, the combination with a frame, of a white container and a yolk container removably mounted thereon, a strainer having a wire bottom removably mounted on the said frame above the white container, the said strainer having a hole in the wall thereof and a spout extending outwardly beneath said hole above said yolk container.

2. In an egg separator, the combination with a frame, of a white container mounted thereon, a strainer having a wire bottom and removably mounted on said frame above the white container, said strainer having a side wall provided with a yoke passage therein, and a spout extending outwardly beneath the said passage.

In testimony whereof, I affix my signature, in the presence of two witnesses.

FLORA L. MARCILLE.

Witnesses:
MARY C. HOUSTON,
H. B. MARCILLE.